(12) United States Patent
Ophir

(10) Patent No.: US 6,688,117 B1
(45) Date of Patent: Feb. 10, 2004

(54) METHOD OF IMPROVING THE PERFORMANCE OF HEAT-PUMP INSTALLATIONS FOR MAKING ICE

(75) Inventor: Avraham Ophir, Herzliya (IL)

(73) Assignee: I.D.E. Technologies, Ltd., Raanana (IL)

( * ) Notice: Subject to any disclaimer, the term of this patent is extended or adjusted under 35 U.S.C. 154(b) by 0 days.

(21) Appl. No.: 10/168,090
(22) PCT Filed: Sep. 8, 2000
(86) PCT No.: PCT/IL00/00547
§ 371 (c)(1), (2), (4) Date: Aug. 13, 2002
(87) PCT Pub. No.: WO01/44665
PCT Pub. Date: Jun. 21, 2001

(30) Foreign Application Priority Data

Dec. 17, 1999 (IL) .................................................. 133576

(51) Int. Cl.⁷ ................................................ F25C 1/00
(52) U.S. Cl. ........................................................... 62/74
(58) Field of Search ............................. 62/74, 347, 268, 62/100, 260, 270

(56) References Cited

U.S. PATENT DOCUMENTS

| | | | | |
|---|---|---|---|---|
| 1,455,156 A | * | 5/1923 | Wilson | ........................ 62/331 |
| 2,723,536 A | * | 11/1955 | Mason | ........................ 62/347 |
| 3,830,660 A | | 8/1974 | Ezell | |
| 3,851,822 A | * | 12/1974 | Pocrnja et al. | ................. 239/2.1 |
| 4,142,678 A | * | 3/1979 | Bottum | ................. 237/2 B |
| 4,145,193 A | * | 3/1979 | Hegemann | .................. 96/253 |
| 4,329,787 A | * | 5/1982 | Newton | .................. 34/254 |
| 4,400,891 A | | 8/1983 | Kongshaug | |
| 5,218,828 A | * | 6/1993 | Hino | .......................... 62/59 |
| 5,277,031 A | * | 1/1994 | Miller et al. | .................. 62/100 |
| 5,317,882 A | | 6/1994 | Ritenour et al. | |
| 5,386,703 A | * | 2/1995 | Later | .......................... 62/268 |
| 5,505,055 A | * | 4/1996 | Franklin, Jr. | .................. 62/74 |
| 5,520,008 A | | 5/1996 | Ophir et al. | |
| 5,992,169 A | * | 11/1999 | Later | .......................... 62/270 |
| 6,322,617 B1 | * | 11/2001 | Wurz et al. | .................. 96/314 |

FOREIGN PATENT DOCUMENTS

| | | | |
|---|---|---|---|
| EP | 000175047 A2 | * | 3/1986 |
| GB | 2 017 213 A | | 10/1979 |
| GB | 2 144 531 A | | 3/1985 |

* cited by examiner

Primary Examiner—William C. Doerrler
Assistant Examiner—Mohammad M. Ali
(74) Attorney, Agent, or Firm—Birch, Stewart, Kolasch & Birch, LLP

(57) ABSTRACT

A method is provided for improving the performance of a heat-pump installation for making ice operating on the principle of mechanical water vapor compression. The installation comprises an evaporator-freezer chamber communicating with a compressor chamber having a centrifugal compressor unit. The method comprises a) providing a first droplet separator of the louver type between the evaporator-freezer chamber and the compressor chamber, for primary separation of the coarser droplets; b) providing a second droplet separator of the knitmesh type downstream of the first droplet separator, for secondary separation of the remaining fine spray, and c) providing a continuous or intermittent spray of a dilute solution of a highly water-soluble inorganic salt in counter-current to the vapor flow from a plurality of spray nozzles located between the first and the second droplet separators and facing the first droplet separator.

12 Claims, 1 Drawing Sheet

METHOD OF IMPROVING THE PERFORMANCE OF HEAT-PUMP INSTALLATIONS FOR MAKING ICE

This application is the national phase under 35 U.S.C. §371 of PCT International Application No. PCT/IL00/00547 which has an International filing date of Sep. 8, 2000, which designated the United States of America.

FIELD OF THE INVENTION

This invention is concerned with a method of improving the performance of heat-pump installations for making ice, operating on the principle of mechanical water-vapor compression, in particular such installations using "hard" water.

The improvements provided by the present invention consist in the elimination of problems caused by the carry-over of fine water droplets from the evaporator-freezer chamber into the compressor chamber via droplet separators. This may result in the incrustation of the droplet separators and of the high-speed rotary equipment in the compressor chamber with ice and hard scale, and may cause a decline in efficiency, as well as wear of the rotary compressors. A further problem which way be caused by the carryover of water droplets is the freezing of such subcooled droplets on the droplet separators, causing clogging of the vapor passage therethrough.

BACKGROUND OF THE INVENTION

It has been known in principle, and proven in practice, that ice (for the purposes of desalination, cooling, sports, entertainment, etc.), can be produced on a large scale, quite economically, by causing water to simultaneously boil and freeze under vacuum at its triple point (0° C. and 4 mmHg). The very large volume of ratified water-vapor thus produced, must then be compressed to pressures and temperatures at which it can be condensed by readily available means, such as air-cooling or water from a conventional cooling-tower.

A large scale installation of this type is disclosed in Applicants' Israel Patent No. 106945 and U.S. Pat. No. 5,520,008, and has been proven by opening over several years to be very practical and economical. This installation basically comprises an evaporator-freezer chamber communicating with a compressor chamber which, in turn, communicates with a condenser chamber. The compressor chamber contains a pair of light efficient, high-throughput and high-speed impellers of a relatively high compression ratio, operating in series. An effective droplet (mist) separator of a low pressure-drop is interposed between the two impellers. Another droplet separator is situated between the evaporator-freezer chamber, and the compressor chamber. The duty of these droplet separators is to protect the high-speed impellers from being eroded or otherwise harmed by droplets or other particles entertained with the vapor, as will be explained below. Such droplet separators can be of the "louver" type (causing a sharp change of the direction of the vapor flow), or of the "knitmesh" (porous mattress) type, or both types can be used in combination.

Ideally, when an installation of the above type is operated with pure water which is fed into the evaporator-freezer chamber, the droplets of the pure water which are entrained by the water vapor, when encountering the droplet separator interposed between the evaporator-freezer chamber and the compressor chamber, coalesce and grow to sizes, the weight of which can overcome the drag-force of the vapor, so that the droplets drip down in a controllable manner, back into the evaporator-freezer chamber. However, as the pure water droplets become subcooled, they might freeze upon contact with the droplet separator surface, sticking to them and clogging the vapor passages. This problem can be overcome by providing means for periodically or continuously heating the droplet separator, so as to melt the ice formed thereon. Such a solution is applicable, and often used, with louver type droplet separators, but is impractical with the more efficient knitmesh type droplet separators.

Considerably more serious problems arise when an ice making installation such as described above is fed with "hard" water, i.e., water containing sparsely soluble salts, such as sulfates and carbonates of calcium and magnesium. These impurities become much concentrated in the evaporator freezer chamber through the elimination of water by both evaporation and freezing, often to beyond their saturation levels. Upon contact of such super-saturated droplets with solid surfaces, the sparingly soluble salts contained therein will precipitate on such surfaces to form an adherent scale. Heating in this case will only aggravate the situation by causing water to evaporate and more salts to precipitate. On the other hand, because of their low solubility, such solids cannot effectively be washed away with water, and may necessitate the use of strong acids or other corrosive wash media.

Such scale, when formed in the first droplet separator (interposed between the evaporator-freezer chamber and the compressor chamber) would clog and impede the passage of the water vapor and might even break off and be carried with the vapor stream into the compressor, thus risking damage to the impeller blades.

It has been found that the tenacity of adhesion of different salts to solid surfaces will vary with their water solubility, being least for the more soluble salts and highest for the sparsely soluble salts, such as the sulfates and carbonates mentioned above. The latter salts may be tenacious enough to stick even to the rapidly tuning impeller blades, disturbing their fine balance, causing vibrations and rapid wear of their bearings. This scale, incrusted on the impeller blades, may accumulate to such thickness, as to reduce the hydrodynamic efficiency of the installation. Moreover, the high centrifugal forces of the impeller blades may ultimately overcome the adhesion of the scale, causing splinters thereof to break off and fly outwardly at very high speeds and kinetic energies. Such "bullets" can be highly destructive by causing rapid erosion of the impeller blade tips and shroud vanes.

Another serious drawback is the inability to use the highly efficient knitmesh-type droplet separators under such circumstances in ice making installations of this type, because of the easiness of their incrustating with ice and scale.

SUMMARY OF THE INVENTION

It is the object of the present invention to overcome the above mentioned problems and to provide an economically feasible method for protecting heat-pump installations for producing ice by mechanical water vapor compression from the operating and maintenance problems described above, caused by incrustation of some of their critical components with ice and/or with hard solids emanating from impurities contained in the water fed to them.

The above object is achieved by the present invention, which provides a method of improving the performance of a heat-pump installation for making ice operating on the principle of mechanical water vapor compression and comprising an evaporator-freezer chamber communicating with a compressor chamber comprising at least one centrifugal compressor unit and communicating with a condenser chamber, said method comprising:

a. providing a first droplet separator of the louver type between the evaporator-freezer chamber and the compressor chamber, for primary separation of the coarser droplets b. providing a second droplet separator of the knitmesh type downstream of the first droplet separator, for secondary separation of the remaining fine spray, and c. providing a continuous or intermittent spray of a dilute solution of a highly water-soluble inorganic salt counter-currently to the vapor flow from a plurality of spray nozzles located between said first and second droplet separators and facing said first droplet separator.

It bas been found that the method, according to the present invention, eliminates the formation of ice on the droplet separators, as well as the formation of hard and tenacious deposits on either the droplet separators or on the impeller blades. Firstly, the freezing point depression of water caused by the dissolved water soluble inorganic salts, prevents ice formation on the surfaces of the droplet separators. Secondly, the other solids deposited on both the droplet separators and the impeller blades were found to be soft and powdery, so that they are readily swept by the vapor flow. It is believed that the deposited hard particles of the low-solubility sulfates and carbonates are "diluted" by the much larger quantity of the highly water soluble inorganic salt which is deposited together with the former.

Furthermore, the "mixed deposits" of the low solubility salts and the water soluble inorganic salts lack adhesion to the surfaces of the solid equipment, and thus do not normally accumulate on the impeller blades and can be readily and effectively removed by a water-wash, if this ever becomes necessary.

DESCRIPTION OF THE INVENTION

The louver type droplet separator is common in the art, and generally comprises a plurality of closely spaced "chevron" shaped members, the surfaces of which are inclined to the direction of vapor flow, thus providing impingement surfaces for the droplets and a multiplicity of narrow, tortuous passageways between the members. The "knitmesh" drop separator is also of the type common in the art, and may include closely packed layers of screening, mesh, chain or other types of packing which provide a high surface area for capturing the entrained mist or droplets.

The highly water-soluble inorganic salt, a solution of which is sprayed counter-currently to the vapor flow, will be referred to hereinafter as "salt" for short. Examples of such salts which can be used in the method according to the invention are alkali metal and alkaline metal halides (such as sodium and potassium chloride or bromide and magnesium chloride), nitrates and the like, The most preferred salt is sodium chloride, for reasons of availability and economy.

The concentration of the salt in the water solution to be sprayed in accordance with the invention can be from about 2% to about 6% by weight. A 5% aqueous solution of sodium chloride is preferred. It has been found that when sodium chloride is used according to the invention, even in very hard water, only a comparatively small amount of it is required, i.e. less than 1 kg. of sodium chloride for each ton of ice produced. This is tolerable, both technically and economically.

The major part of the sprayed salt solution, except for the droplets which will be swept with the vapor flow past the droplet separators into the compressor chamber, is returned to the evaporator-freezer chamber, and will be contained in the ice slurry product which is continuously withdrawn from the evaporator-freezer chamber. In many ice making installations of this type, this ice slurry is further separated into an ice-rich slurry or dewatered solid ice, and a solution called "concentrate", The salt, as well as the sparsely soluble, sulfates and carbonates, would accumulate in this concentrate, which, in spite of its name, is quite dilute. For both economical and ecological considerations, and in accordance with an embodiment of the invention, the sparsely water soluble salts can be separated from the concentrate by known means, e.g. by nano-filtration, and the resulting dilute salt solution can then be further concentrated, e.g., by reverse osmosis, to yield a salt solution of about 5% concentration, which is then recycled to the spray nozzles. In accordance with this embodiment, there is no risk of pollution to the environment.

In accordance with a preferred embodiment of the invention, the first (louver type) and the second (knitmesh type) droplet separators are located horizontally and parallel to each other, at the outlet of the evaporator-freezer chamber or adjacent thereto, the second droplet separator being topmost. In accordance with this embodiment, the direction of the spray from the spray nozzles interposed between the two droplet separators will be downwardly.

In accordance with a further embodiment of the method according to the invention, means are also provided to heat the first louver type droplet separator continuously or periodically.

BRIEF DESCRIPTION OF THE DRAWING

In order to understand the invention and to see how it may be carried out in practice, reference will be made in the following description by way of a non-limiting example only, to the accompanying drawing in which.

DETAILED DESCRIPTION OF THE INVENTION

Figure 1:
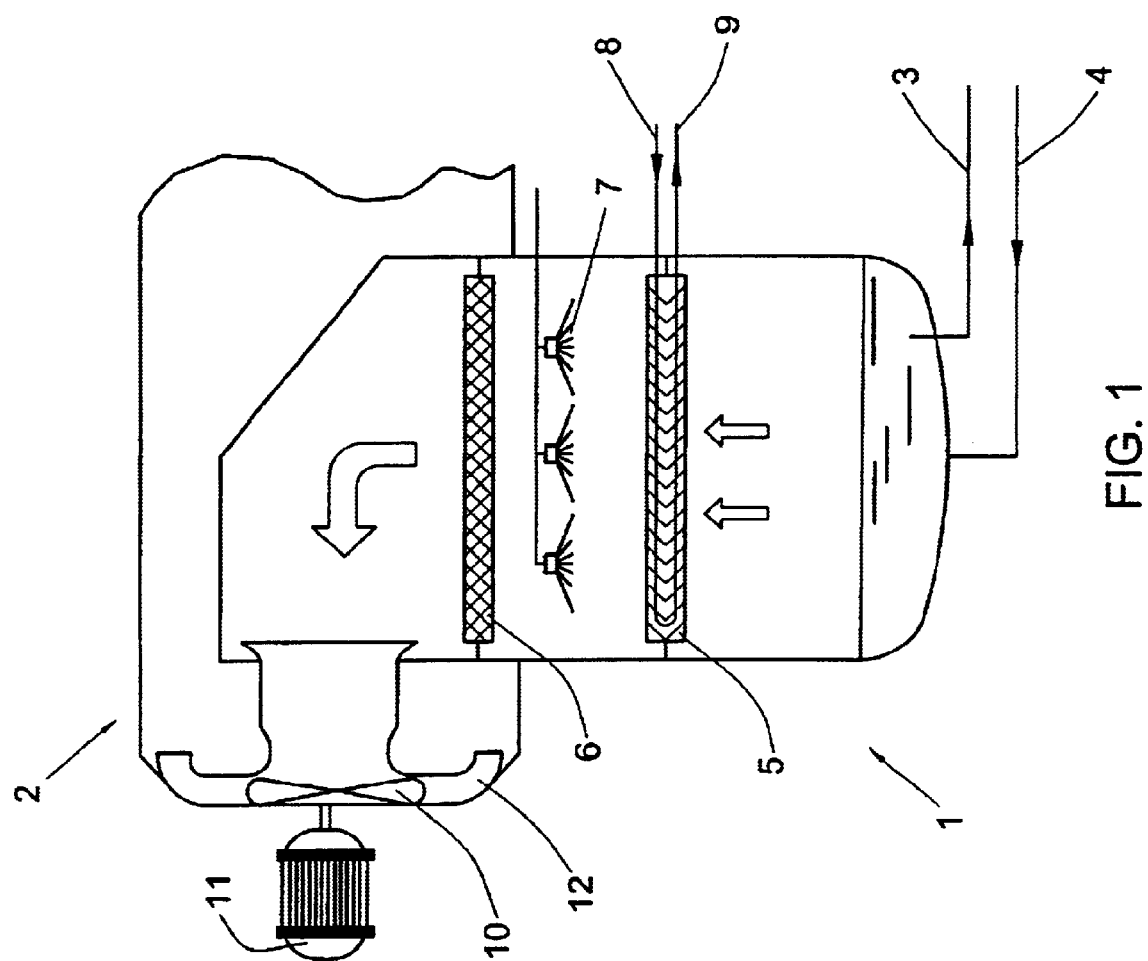
FIG. 1 is a schematic partial view in cross section of a heat-pump installation for making ice, operating on the principle of mechanical water vapor compression.

FIG. 1 illustrates schematically a partial cross section of an ice making heat pump installation, comprising an evaporator freezer chamber, generally referenced as 1, and a partial view of a compression chamber, generally referenced as 2. The evaporator-freezer chamber 1 is provided with an inlet 3 for the feed water, and an outlet 4 for withdrawing the ice slurry. The hollow arrows represent the vapor flow from the evaporator-freezer chamber to the compressor chamber. At the outlet of the evaporator-freezer chamber 1 to the compressor chamber 2, there are provided a louver type droplet separator 5, and downstream therefrom and parallel thereto, a knitmesh type droplet separator 6. Between the two droplet separators, there is provided an array of spray nozzles 7, adapted to spray a dilute solution of a highly water soluble inorganic salt in the direction counter-currently to the vapor flow. The louver type droplet separator 5 is provided with a system of pipes for circulating therethrough a heating medium, preferably water, so as to maintain the temperature of the outer surfaces of the droplet separator above the vapor temperature, by about 4 to about 10° C. The inlet and the outlet of this heating medium system are referenced in the drawing as 8 and 9 respectively.

Within the compressor chamber 2, there are schematically shown a high speed impeller 10, driven by an external motor 11, and surrounded by shroud vanes 12.

It should be realized that various changes may be made to the specific embodiments shown and described above, without departing from the principles of the present invention.

What is claimed is:

1. A method of improving the performance of a heat-pump installation for making ice operating on the principle of mechanical water vapor compression and comprising an evaporator-freezer chamber communicating with a compressor chamber comprising at least one centrifugal compressor unit, said method comprising:
   a. providing a first droplet separator of the louver type between the evaporator-freezer chamber and the compressor chamber, for primary separation of the coarser droplets;
   b. providing a second droplet separator of the knitmesh type downstream of the first droplet separator, for secondary separation of the remaining fine spray, and
   c. providing a continuous or intermittent spray of a dilute solution of a highly water-soluble inorganic salt counter-currently to the vapor flow, from a plurality of spray nozzles located between said first and second droplet separators and facing said first droplet separator.

2. A method according to claim 1, wherein the concentration of the sprayed solution is highly water soluble inorganic salt is from about 2% to about 6% by weight.

3. A method according to claim 2, wherein said concentration is about 5% by weight.

4. A method according to claim 1, wherein said inorganic salt is NaCl.

5. A method according to claim 4, wherein a 5% aqueous solution is sprayed in the amount of about 1 kg of NaCl per each ton of ice produced.

6. A method according to claim 4, wherein the ice slurry withdrawn from the evaporator-freezer chamber is separated into an ice-rich slurry or dewatered solid ice and a "concentrate", the sparingly soluble salts are separated from the concentrate and the resulting NaCl solution is concentrated to a solution of about 5% NaCl which is recycled to the spray nozzles.

7. A method according to claim 1, wherein said first and second droplet separators are located horizontally and parallel to each other at the outlet of the evaporator-freezer chamber or adjacent thereto, the second droplet separator being topmost.

8. A method according to claim 1, wherein means are further provided for heating the first louver type droplet separator continuously or periodically.

9. A heat pump installation for making ice, operating on the principle of mechanical water vapor compression, and comprising basically an evaporator-freezer chamber, communicating with a compressor chamber comprising at least one centrifugal compressor unit, said installation characterized in that it further comprises:
   a. a first droplet separator of the louver type, interposed between the evaporator-freezer chamber and the compressor chamber;
   b. a second droplet separator of the knitmesh type, downstream of the first droplet separator and parallel thereto; and
   c. a plurality of spray nozzles located between said first and second droplet separators, facing said first droplet separator, capable of providing a continuous or intermittent spray of a dilute solution of a highly water-soluble inorganic salt, counter-currently to the vapor flow.

10. An installation according to claim 9, wherein said first and second droplet separators are located at or adjacent to the outlet of the evaporator-freezer chamber.

11. An installation according to claim 9, further comprising means for heating said first louver type droplet separator, continuously or periodically.

12. An installation according to claim 9, further comprising means for separating the ice slurry withdrawn from the evaporator-freezer chamber, to provide an ice-rich slurry or dewatered solid ice and a "concentrate", means for separating sparingly water-soluble inorganic salt, means for concentrating said solution to a desired concentration of the highly water-soluble inorganic salt, and means for recycling the resulting concentrated solution to said spray nozzles.

* * * * *